(12) United States Patent
Kondogiani et al.

(10) Patent No.: US 11,745,405 B2
(45) Date of Patent: Sep. 5, 2023

(54) CONTINUOUS POLYMERIC LINER PRODUCTION METHODS FOR CONFORMABLE PRESSURE VESSELS

(71) Applicant: Third Shore Group, LLC, Novi, MI (US)

(72) Inventors: Christopher T. Kondogiani, Novi, MI (US); Michael F. Donoughe, Rochester, MI (US)

(73) Assignee: Noble Gas Systems, Inc., Novi, MI (US)

( * ) Notice: Subject to any disclaimer, the term of this patent is extended or adjusted under 35 U.S.C. 154(b) by 86 days.

(21) Appl. No.: 17/208,646

(22) Filed: Mar. 22, 2021

(65) Prior Publication Data
US 2021/0206042 A1 Jul. 8, 2021

Related U.S. Application Data

(63) Continuation of application No. 15/791,954, filed on Oct. 24, 2017, now Pat. No. 10,953,584.

(Continued)

(51) Int. Cl.
| | | |
|---|---|---|
| B29C 48/00 | (2019.01) | |
| B29C 53/30 | (2006.01) | |
| B29C 55/22 | (2006.01) | |
| B29C 48/09 | (2019.01) | |
| B29C 49/00 | (2006.01) | |

(Continued)

(52) U.S. Cl.
CPC ......... *B29C 48/0019* (2019.02); *B29C 48/09* (2019.02); *B29C 48/2566* (2019.02); *B29C 48/303* (2019.02); *B29C 49/0021* (2013.01); *B29C 53/30* (2013.01); *B29C 55/22* (2013.01); *B29C 48/13* (2019.02); *B29C 48/32* (2019.02); *B29L 2031/7156* (2013.01)

(58) Field of Classification Search
CPC combination set(s) only.
See application file for complete search history.

(56) References Cited

U.S. PATENT DOCUMENTS 3,844,700 A * 10/1974 Sokolow ............... B29B 13/024
                                                  425/529
4,038,011 A *  7/1977 Lemelson ............. B29C 48/325
                                                  425/467

(Continued)

FOREIGN PATENT DOCUMENTS

CN             201415241 Y        3/2010

*Primary Examiner* — Galen H Hauth
*Assistant Examiner* — Shibin Liang
(74) *Attorney, Agent, or Firm* — Young Basile Hanlon & MacFarlane, P.C.

(57) ABSTRACT

A method and apparatus for forming a pressure vessel liner are disclosed. One method includes forming an extruded tube by extruding a parison through a die and a mandrel and forming main body sections and return line sections in the extruded tube according to a first pattern. A cross-sectional area of the return line sections is smaller than a cross-sectional area of the main body sections. The method further includes changing the pattern according to which the main body sections and the return line sections are formed from the first pattern to a second pattern without stopping the forming of the extruded tube and forming the main body sections and the return line sections in the extruded tube according to the second pattern.

17 Claims, 12 Drawing Sheets

Related U.S. Application Data

(60) Provisional application No. 62/411,918, filed on Oct. 24, 2016.

(51) Int. Cl.
    *B29C 48/25*     (2019.01)
    *B29C 48/30*     (2019.01)
    *B29L 31/00*     (2006.01)
    *B29C 48/13*     (2019.01)
    *B29C 48/32*     (2019.01)

(56) References Cited

U.S. PATENT DOCUMENTS 5,454,208 A * 10/1995 Kawano ............... B29D 22/003
                                                          53/433
2016/0363265 A1* 12/2016 Griffith .................... F17C 1/16

\* cited by examiner

CONTINUOUS POLYMERIC LINER PRODUCTION METHODS FOR CONFORMABLE PRESSURE VESSELS

CROSS-REFERENCE TO RELATED APPLICATIONS

This application is a continuation application of U.S. patent application Ser. No. 15/791,954, filed Oct. 24, 2017, which claims priority to U.S. Provisional Patent Application Ser. No. 62/411,918, filed Oct. 24, 2016, the entire disclosures of which are incorporated by reference.

BACKGROUND

Conformable pressure vessel concepts offer improved storage efficiencies and reduced system weights compared to traditional cylindrical designs. These pressure vessels may be comprised of a plurality of smaller cylindrical vessels that can be stacked or bundled to fit into a predetermined packaging space.

Production of conformable pressure vessels requires the fabrication of a polymeric pressure vessel liner to act as a barrier layer to prevent permeation of the liquids and gasses contained by the pressure vessel at high pressures. One method for production of pressure vessel liners is to extrude a continuous plastic tube and send the plastic tube through a corrugation process that creates the desired profile comprising rigid main body sections and flexible return lines.

One limitation of existing fabrication methods is insufficient speed of the corrugator, which restricts production capacity. Fabricating the larger main body sections and smaller return lines requires speed reductions in the corrugator, further restricting production volumes. Producing larger amounts of plastic pressure vessel liners therefore requires numerous pieces of expensive production equipment and significant floor space.

An additional limitation of existing equipment is that the number of mold elements in the repeating pattern is constrained by the equipment design. Some pressure vessel liner geometries are only possible to achieve by adding an excessive amount of additional mold elements to the pattern. This lengthens the equipment, which adds to the cost and overall size of the equipment. Other pressure vessel liner geometries are not possible to achieve because the pattern of mold elements required would be too large to be practical.

An additional fabrication method for pressure vessel liners involves the separate production of extruded main body sections and formed return lines. This improves throughput, but joining the segments together introduces several potential leak paths that are exacerbated by high pressure, extreme temperatures, and pressure cycling.

Another limitation of existing fabrication methods is inconsistent mechanical properties, including variability of wall thickness and material properties of the pressure vessel liners. This is caused by the limitations of the forming equipment which has difficulties creating a larger outer diameter and a smaller return line diameter from a single extruded tube.

Another limitation of existing fabrication methods is the inflexibility of the forming equipment, which cannot produce flexible main body lengths without stopping the process and reconfiguring the equipment. Stopping production and reconfiguring equipment further reduces effective production capacity and results in more connections between varying length pressure vessels, leading to additional potential leak paths.

SUMMARY

Several alternative polymeric pressure vessel liner production methods and apparatuses are disclosed. The methods include improving the flexibility of pressure vessel production by introducing automated methods for changing out mold elements without stopping the production run. Alternative forming methods are also disclosed for producing variable lengths of main body sections with improved mechanical properties at high extrusion rates without the need for reconfiguration of a corrugator.

One method for forming a pressure vessel liner includes forming an extruded tube by extruding a parison through a die and a mandrel; forming main body sections and return line sections in the extruded tube according to a first pattern, wherein a cross-sectional area of the return line sections is smaller than a cross-sectional area of the main body sections; changing the pattern according to which the main body sections and the return line sections are formed from the first pattern to a second pattern without stopping the forming of the extruded tube; and forming the main body sections and the return line sections in the extruded tube according to the second pattern.

One apparatus for forming pressure vessel liners includes an extruder that drives a parison through a die and a mandrel to form an extruded tube; and a formation unit that forms the extruded tube into main body sections and return line sections according to a first pattern, changes the pattern according to which the main body sections and the return line sections are formed to a second pattern without stopping the extrusion of the extruded tube; and forms the extruded tube into the main body sections and the return line sections according to the second pattern.

Another method for forming a pressure vessel liner includes forming an extruded tube by extruding a parison through a die and a mandrel; using a corrugator having a set of mold elements, forming main body sections and return line sections in the extruded tube according to a pattern; using an interchange mechanism, selectively replacing large diameter mold elements in the set of mold elements with small diameter mold elements; and using the corrugator and the selectively replaced mold elements, forming the main body sections and the return line sections in the extruded tube according to the pattern.

Another method for forming a pressure vessel liner includes forming an extruded tube by extruding a parison through a die and a mandrel; and forming main body sections and return line sections in the extruded tube by alternating application of small diameter sections and large diameter sections of a pair of drums to the extruded tube. A cross-sectional area of the return line sections is smaller than a cross-sectional area of the main body sections, and a pattern of the main body sections and the return line sections is formed without stopping the forming of the extruded tube by applying the pair of drums to form the small diameter sections on the extruded tube.

Another method for forming a pressure vessel liner includes forming an extruded tube by extruding a parison through a die and a mandrel; and forming main body sections and return line sections in the extruded tube by clamping opposing sections of a molding press together onto the extruded tube. A cross-sectional area of the return line sections is smaller than a cross-sectional area of the main body sections. A pattern of the main body sections and the return line sections is formed without stopping the forming of the extruded tube by expanding the opposing sections of the molding press in a longitudinal direction along an axis parallel to a longitudinal axis of the extruded tube or controlling a frequency with which the opposing sections press together onto the extruded tube.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Pressure vessel liners can be formed using various types of formation units that includes components such as corrugators, mold presses, and/or opposed drums used to shape an extruded plastic parison. Flexibility in application of these various components can improve production speed, reduce space within a production facility, and allow flexibility in parison type and grade when compared to a more standard corrugation process.

Figure 1:
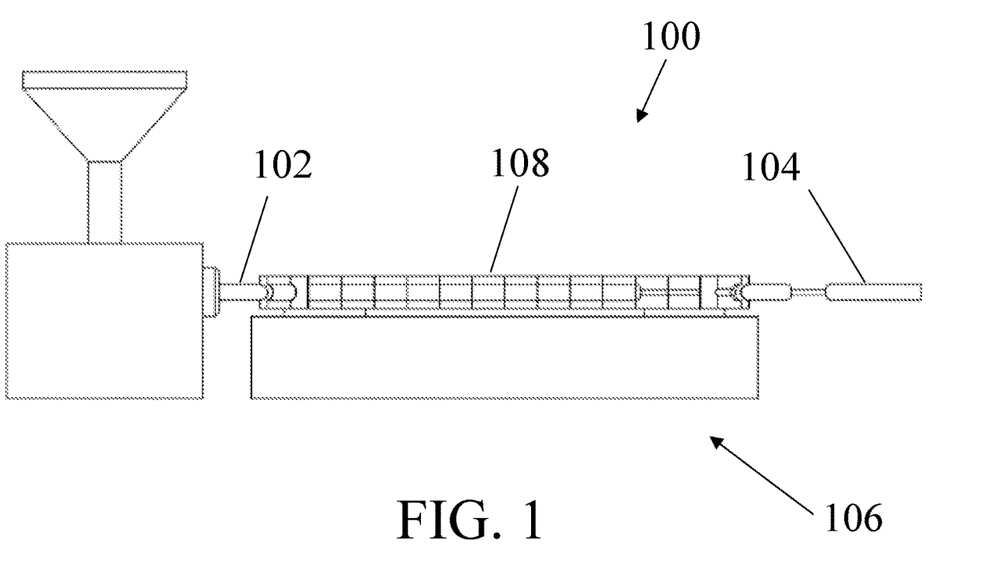
FIG. 1 is a side view of an extrusion corrugator for production of conformable pressure vessel plastic liners.

FIG. 1 is a side view of a corrugator 100 for production of pressure vessel liners for conformable pressure vessels. The corrugator 100 may be positioned in either a vertical or a horizontal manner. The corrugator 100 provides a means to form corrugated and/or straight sections of continuous tubing 102 to serve as the pressure vessel liners. A plastic parison of a predetermined weight is first extruded through an appropriately sized die and mandrel. The predetermined weight of plastic per unit of length is that is necessary to produce the desired wall thickness in the pressure vessel liner. For example, a pressure vessel liner 104 can have a wall thickness determined by the vessel design. The corrugator 100 can include a corrugation bed 106 containing circulating pairs of mold elements 108 in a set pattern used to produce the pressure vessel liners.

Figure 2:
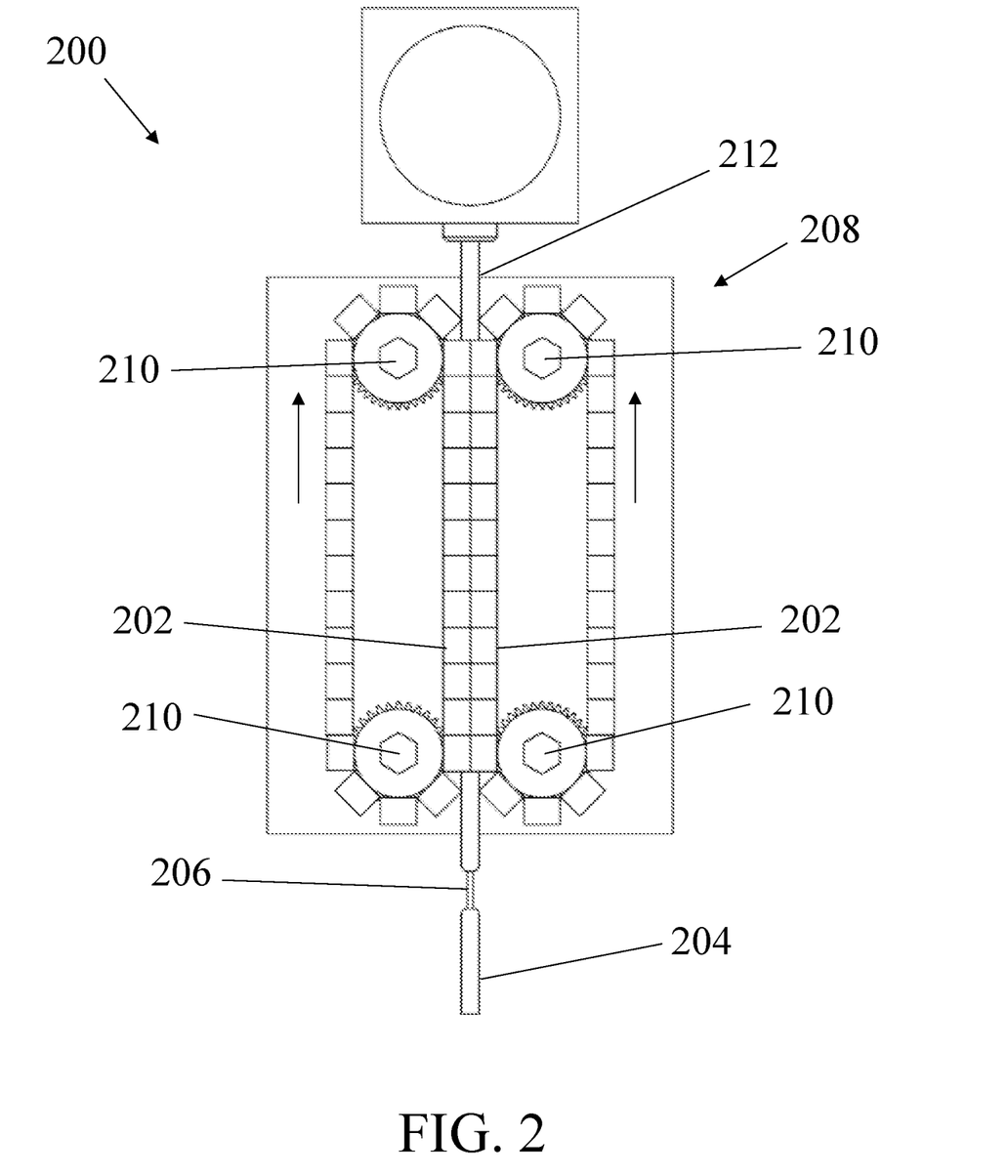
FIG. 2 is a top view of corrugator.

FIG. 2 is a top view of a corrugator 200. The circulating pairs of mold elements 202 are shown, using arrows to indicate the direction of rotation. Application of the mold elements 202 produces a continuous and repeating pattern of main body sections 204 having a large cross-sectional area and return line sections 206 having a smaller cross-sectional area along the pressure vessel liner. Depending on the length of the main body sections 204, each rotational cycle of the mold elements 202 can produce one or more of the main body sections 204. The length of a corrugation bed 208 can be extended by adding additional mold elements 202 and by adding spacers between motor spindles 210 that drive the corrugator 200. This extension in length is necessary to produce variants in length for the main body sections 204 of the pressure vessel liner. However, the pattern of mold elements 202 cannot be adjusted during a production run of the corrugator 200. In other words, the pattern of mold elements 202 cannot be adjusted without stopping extrusion of an extruded tube 212 through an extruder. Additionally, some lengths of the main body sections 204 cannot be produced practically because the number of mold elements 202 required to produce a repeating pattern of main body sections 204 and return line sections 206 of the desired length would exceed the capacity of the corrugator 200.

Figure 3:
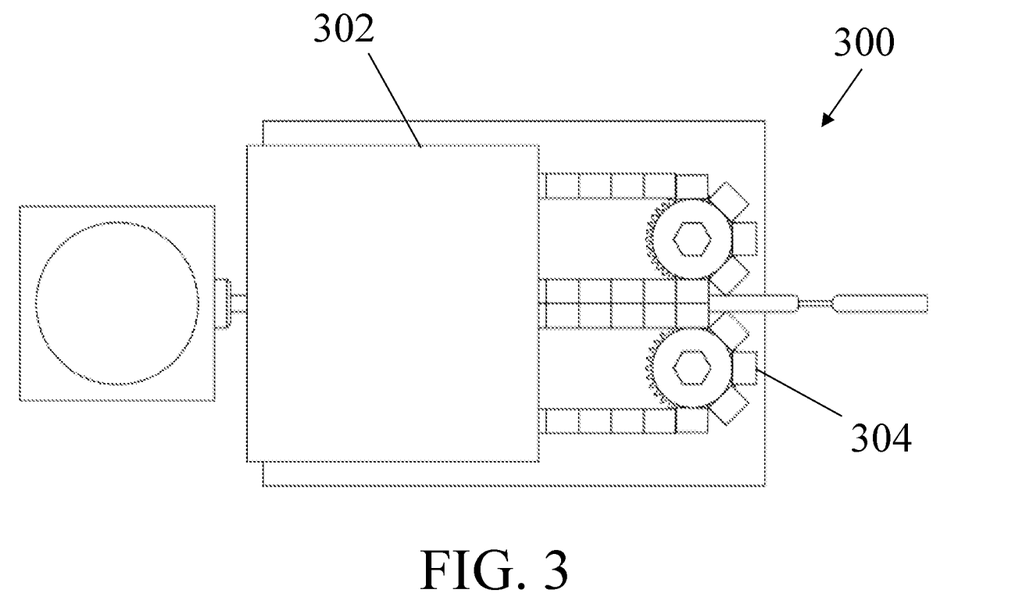
FIG. 3 shows a portion of the corrugator of FIG. 2 with a vacuum and heating box attached.

FIG. 3 shows a portion of a corrugator 300 with a vacuum and heating box 302 attached. The vacuum and heating box 302, also described as a vacuum and heating section 302, is located where molding of an extruded tube into a desired pressure vessel liner profile occurs. In the vacuum and heating box 302, vacuum suction can be added to supplement air pressure applied within the extruded tube in order for the extruded tube to fully conform to mold elements 304. Additionally, heating through induction or by forced heated air can be used to create sufficient mold surface temperatures to prevent such manufacturing issues as inconsistent or premature cooling of the extruded tube, the extruded tube sticking to the surfaces of the mold elements, or insufficient molding temperature.

Figure 4:
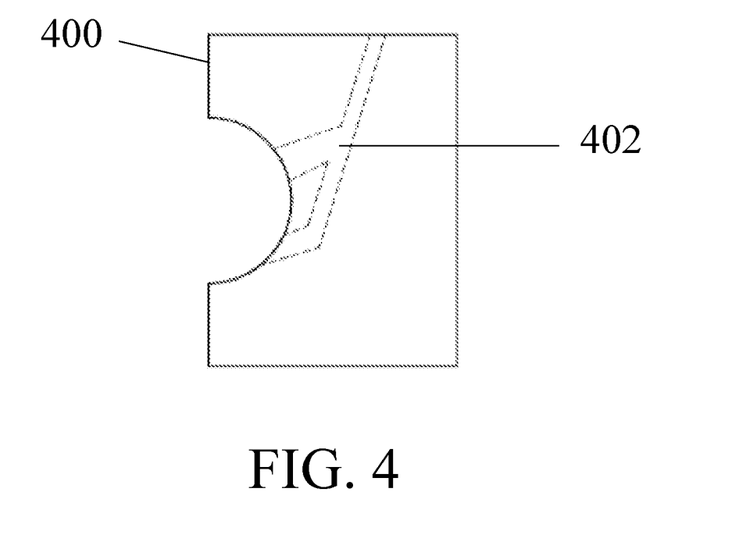
FIG. 4 is a side cut away view of a corrugation mold element showing vacuum slots.

FIG. 4 is a side cut away view of a mold element 400 showing vacuum slots 402. The mold element 400 is fabricated in pairs to form a profile of the outside diameter of each section of the pressure vessel liner. The mold element 400 pairs are separated, indexed, and assembled into a corrugator such that, as the corrugator runs, each mold element 400 rejoins its pair as an extruded tube is molded into the pressure vessel liner profile.

Figure 5:
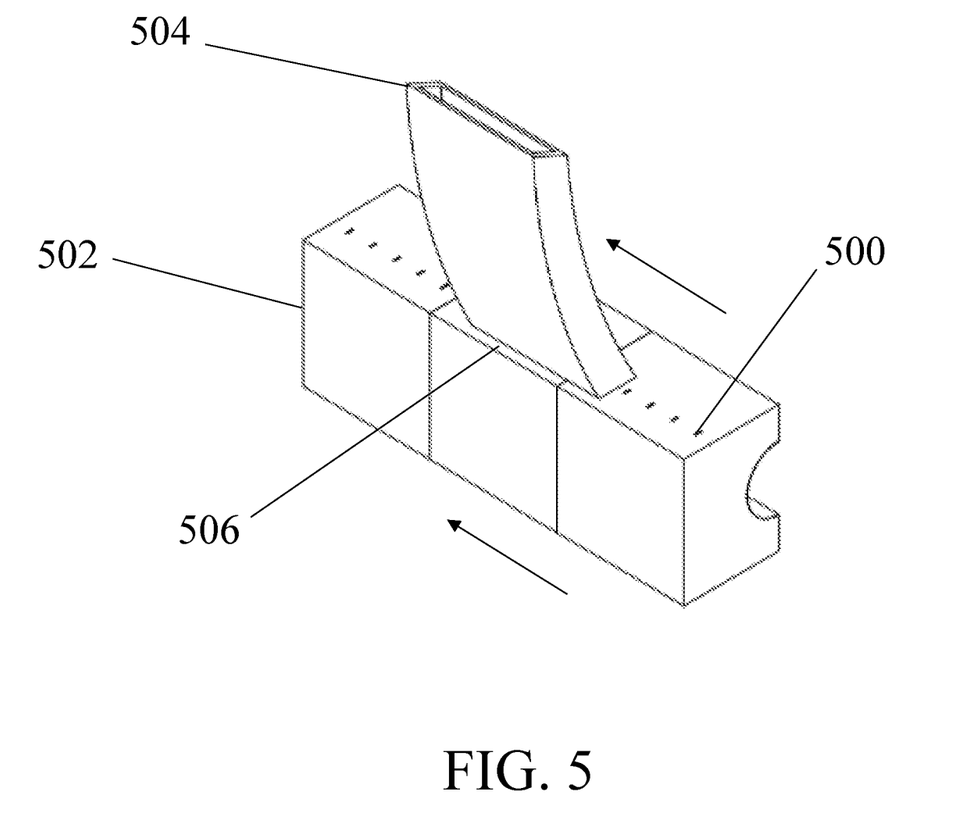
FIG. 5 is a detail view of vacuum slots in mold elements passing by a vacuum tube.

FIG. 5 is a detail view of vacuum slots 500 in mold elements 502 passing by a vacuum tube 504. The vacuum tube 504 applies suction pressure to the vacuum slots 500 in each of the mold elements 502 as they pass by during each circulation cycle (e.g., the cycle described in respect to FIG. 2). The vacuum tube 504 and the vacuum slots 500 are temporarily sealed with a rolling or sliding seal 506 to preserve the suction pressure. Using a similar method, heating or cooling can be applied by forcing high temperature air through the vacuum slots 500 in the mold elements 502.

Figure 6:
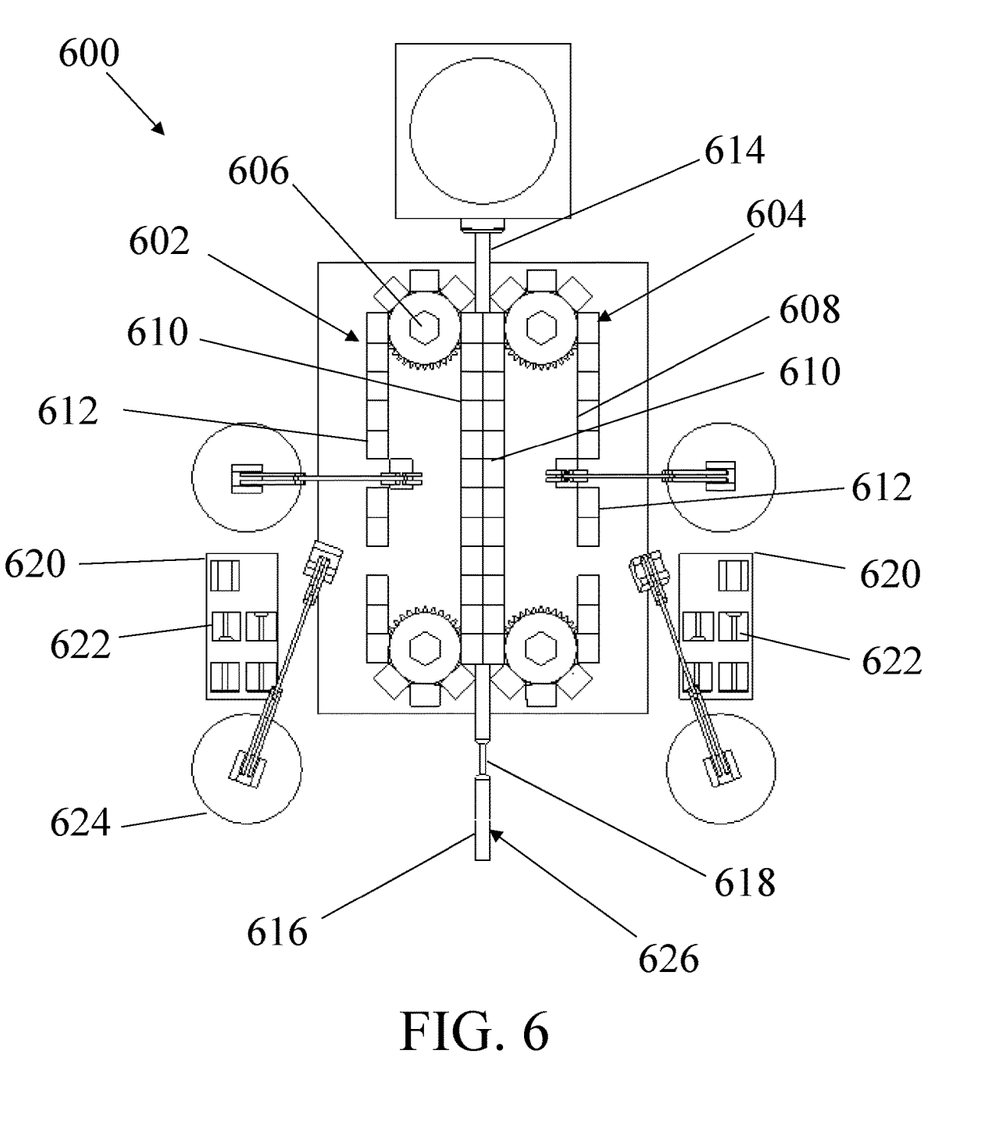
FIG. 6 is a top view of corrugator showing an automated mold element selection and replacement apparatus.

FIG. 6 is a top view of the corrugator 600 showing an automated mold element selection and replacement apparatus. The corrugator 600 can include a first and a second mold element applicator 602, 604. Each of the mold element applicators 602, 604 can include a motor spindle 606 and a belt 608 coupled to the motor spindle 606 that rotates about the motor spindle 606. Each of the mold element applicators 602, 604 can further include a pattern of active mold elements 610 and inactive mold elements 612 attached to the belt 608, wherein the active mold elements 610 are applied to an extruded tube 614 to form the main body sections 616 and the return line sections 618 and the inactive mold elements 612 are not applied to the extruded tube 614. The first mold element applicator 602 can be located on a side of the extruded tube 614 opposite the second mold element applicator 604. The apparatus can also include a mold element storage container 620 that holds alternative mold elements 622. An interchange mechanism 624 can selectively remove the inactive mold elements 612 from the first and second mold element applicators 602, 604, remove the alternative mold elements 622 from the mold element storage container 620, and replace the removed inactive mold elements 612 from the first and second mold element applicators 602, 604 with the alternative mold elements 622.

Operation of the corrugator 600 can include applying circulating pairs of active mold elements 610 in a first pattern to the extruded tube 614, where the pairs of active mold elements 610 form a profile of an outside geometry of each section of a pressure vessel liner 626. Operation of the corrugator 600 can also include removing pairs of inactive mold elements 612 forming the first pattern from the corrugator 600 and replacing the removed pairs of inactive mold elements 612 with pairs of alternative mold elements 618 to form a second pattern. Circulating pairs of the alternative mold elements 618 can be applied according to the second pattern to the extruded tube 614.

With this apparatus, the mold elements 610, 612 for the corrugator 600 can be selectively removed and replaced with the alternative mold elements 618, enabling the pattern of mold elements 610, 612 to be controlled and varied. For example, since the mold elements 610, 612 rotate between positions in which the active mold elements 610 are applied to the extruded tube 614 to form the main body sections 616 and the return line sections 618 and in which the inactive mold elements 612 are not applied to the extruded tube 614, the alternative mold elements 618 can be swapped for particular inactive mold elements 612. This enables the same corrugator 600 to produce pressure vessel liners 626 with a variety of lengths for the main body sections 616 and the return line sections 618. Automated mold element 610, 612 selection and replacement also allows forming a variety of patterns of repeating or variable main body sections 616 and return line sections 618 without the corrugator 600 being taken off-line for manual reconfiguration, improving process timing.

Figure 7:
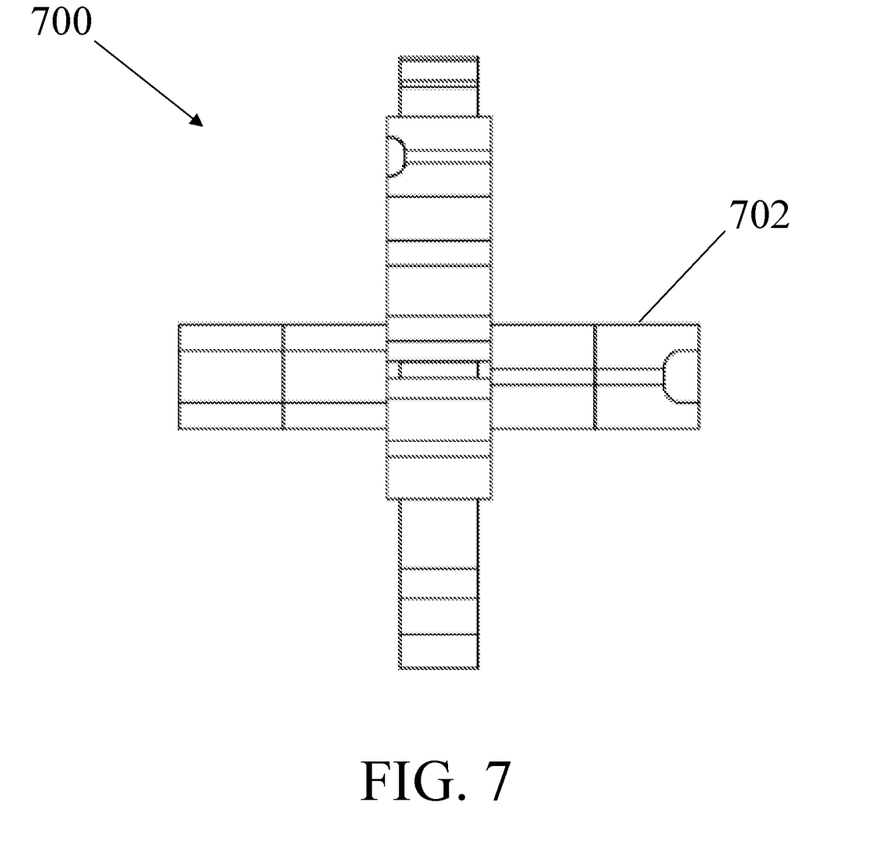
FIG. 7 is a side view of a top-loading automated mold element selection and replacement apparatus.

FIG. 7 is a side view of a top-loading automated mold element selection and replacement apparatus 700. In this system, a single or multiple predefined patterns of mold elements 702 are inserted into a belt of mold elements as shown in FIG. 6.

The embodiments of FIG. 6 and FIG. 7 enable the fabrication of a variety of lengths for the main body sections 616 along the same pressure vessel liner 626 within the same continuous production run of the corrugator 600. Additionally, unique geometries for the main body sections 616 and the return line sections 618 can be formed at any point in the pattern, such as at the beginning and end of pressure vessel liners 626 to support installation of end fittings. For example, the pairs of alternative mold elements 622 used in the second pattern can form a different profile of the outside geometry of each section of the pressure vessel liner 626 relative to the profile formed by the pairs of mold elements 610, 612 used in the first pattern.

Figure 8:
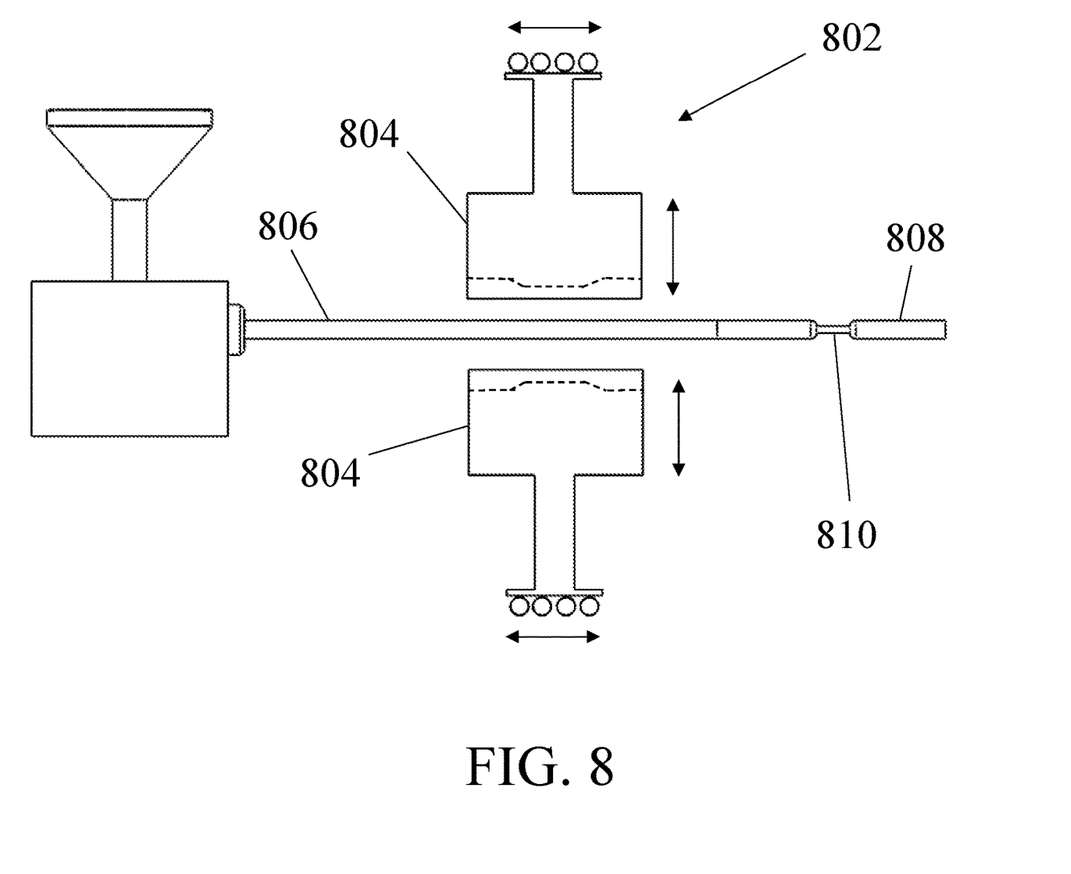
FIG. 8 is a side view of extrusion equipment with a molding press.

FIG. 8 is a side view of a molding press 802. Opposing sections 804 of the molding press 802 clamp together onto an extruded tube 806 to form alternative geometries onto an otherwise uniformly shaped extruded tube 806. The molding press 802 can have the opposing sections 804 where each of the opposing sections 804 is shaped such that the main body sections 808 and the return line sections 810 are formed when the opposing sections 804 are clamped together onto the extruded tube 806. Operation of the molding press 802 can include clamping the opposing sections 804 of the molding press 802 together onto the extruded tube 806 and releasing the opposing sections 804 from the extruded tube 806 according to a first pattern. Operation of the molding press 802 can also include changing a frequency with which the opposing sections 804 clamp together onto the extruded tube 806 to form a second a pattern. The opposing sections 804 of the molding press 802 can be clamped together onto the extruded tube 806 and released from the extruded tube 806 according to the second pattern. In other implementations, operation of the molding press 802 can also include expanding the opposing sections 804 of the molding press 802 in a longitudinal direction along an axis parallel to a longitudinal axis of the extruded tube 806 when the opposing sections 804 of the molding press 802 are clamped onto the extruded tube 806.

The molding press 802 can be horizontally stationary with the opposing sections 804 moving up and down to clamp around the extruded tube 806. The molding press 802 can also be configured to translate horizontally at the same speed as the extruded tube 806 to avoid breaking, tearing, or bunching up of the extruded tube 806 proximate to the molding press 802. In other words, in some implementations the molding press 802 can be stationary relative to longitudinal motion of the extruded tube 806 and in other implementations the molding press 802 can move along an axis parallel to a longitudinal axis of the extruded tube 806 at a speed at which the extruded tube 806 is extruded.

Lead-in features in the horizontally axial direction may also be used to avoid abrupt geometry changes. The molding press 802 may also incorporate heating and vacuum features similar to those described in respect to FIGS. 3, 4, and 5. The application of a single or multiple molding presses 802 can be programmed to produce a variable pattern of cross-sectional geometries as required by the final design of the pressure vessel liner. This enables pressure vessel liners to be manufactured that include multiple main body sections 808 and return line sections 810 without the need to join various sections of separate pressure vessel liners together, reducing the opportunity for leaks in the pressure vessel liner. Additionally, the speed of the extrusion can be maximized by producing a single cross-section and does not need to be varied to produce the different sections of the pressure vessel liner.

Figure 9:
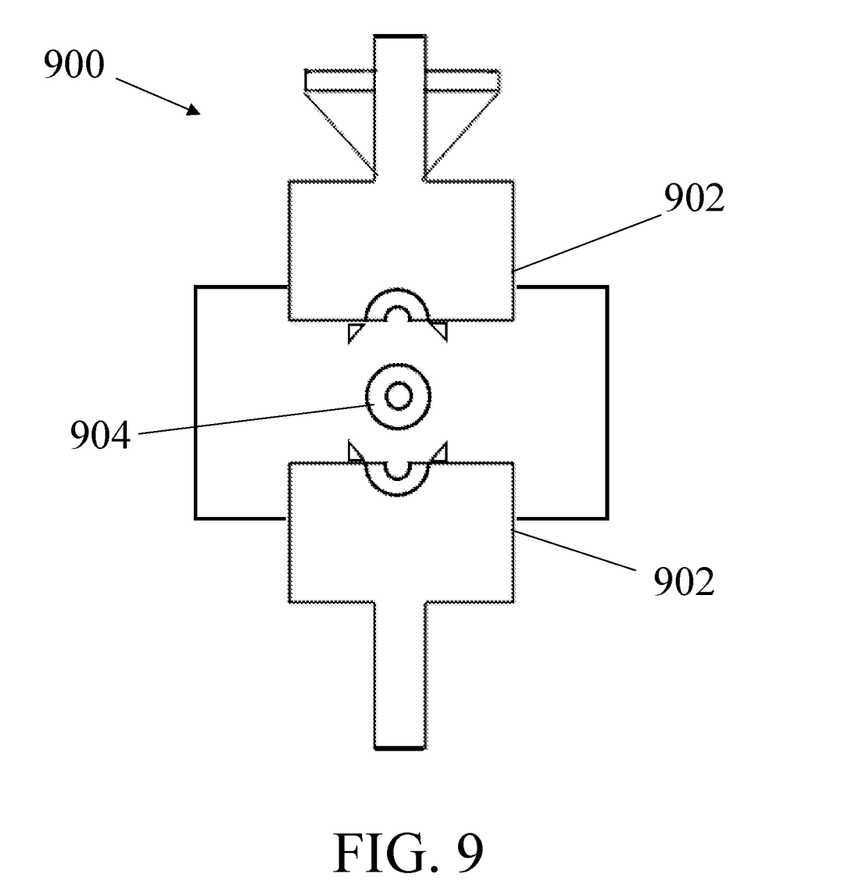
FIG. 9 is an axial view of molding press of FIG. 8.

FIG. 9 is an axial view of a molding press 900. Production of main body sections and return line sections for pressure vessel liners can be effected using the molding press 900. Opposing sections 902 of the molding press 900 can be applied directly to an extruded tube 904 to form main body sections, return line sections, or other unique geometries. In one implementation, the return line sections are formed by narrowing ends of each of the main body sections of the pressure vessel liner, making the return line sections more flexible than the main body sections.

Figure 10:
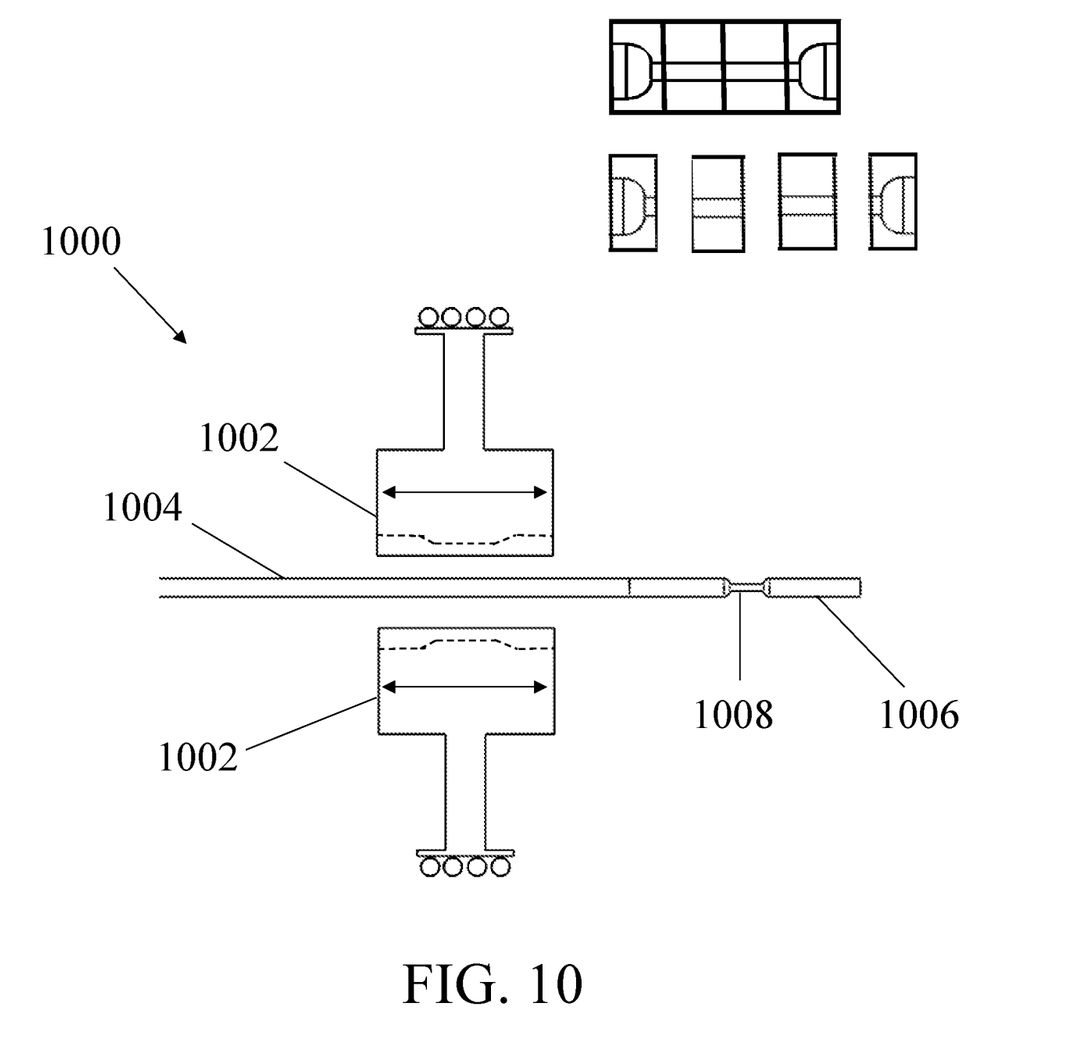
FIG. 10 is a side view of an expanding molding press.

FIG. 10 is a side view of an expanding molding press 1000. The expanding molding press 1000 can have opposing sections 1002, where the opposing sections 1002 clamp together onto an extruded tube 1004 and expand in a longitudinal direction along an axis parallel to a longitudinal axis of the extruded tube 1004 to form main body sections 1006 and return line sections 1008. The expanding molding press 1000 can move along an axis parallel to the longitudinal axis of the extruded tube 1004 at a speed at which the extruded tube 1004 is extruded.

The expanding molding press 1000 expands the extruded tube 1004 in a targeted region in order to reduce the specific weight of material, for example in regions of the return line sections 1008, in order to reduce wall thickness and enable improved material properties. The expanding molding press 1000 can be fitted with a progressive die, for example, a spring-loaded die, that guides the extruded tube 1004 into a proper shape at the selected region. The progressive die can be connected to the expanding molding press 1000, where the progressive die forms the extruded tube 1004 into the main body sections 1006 and the return line sections 1008 in a region of the extruded tube 1004 where the opposing sections 1002 of the expanding molding press 1000 clamp together. The expanding molding press 1000 can also be fitted with cutters that can be used to trim off excess material after shaping.

Figure 11:
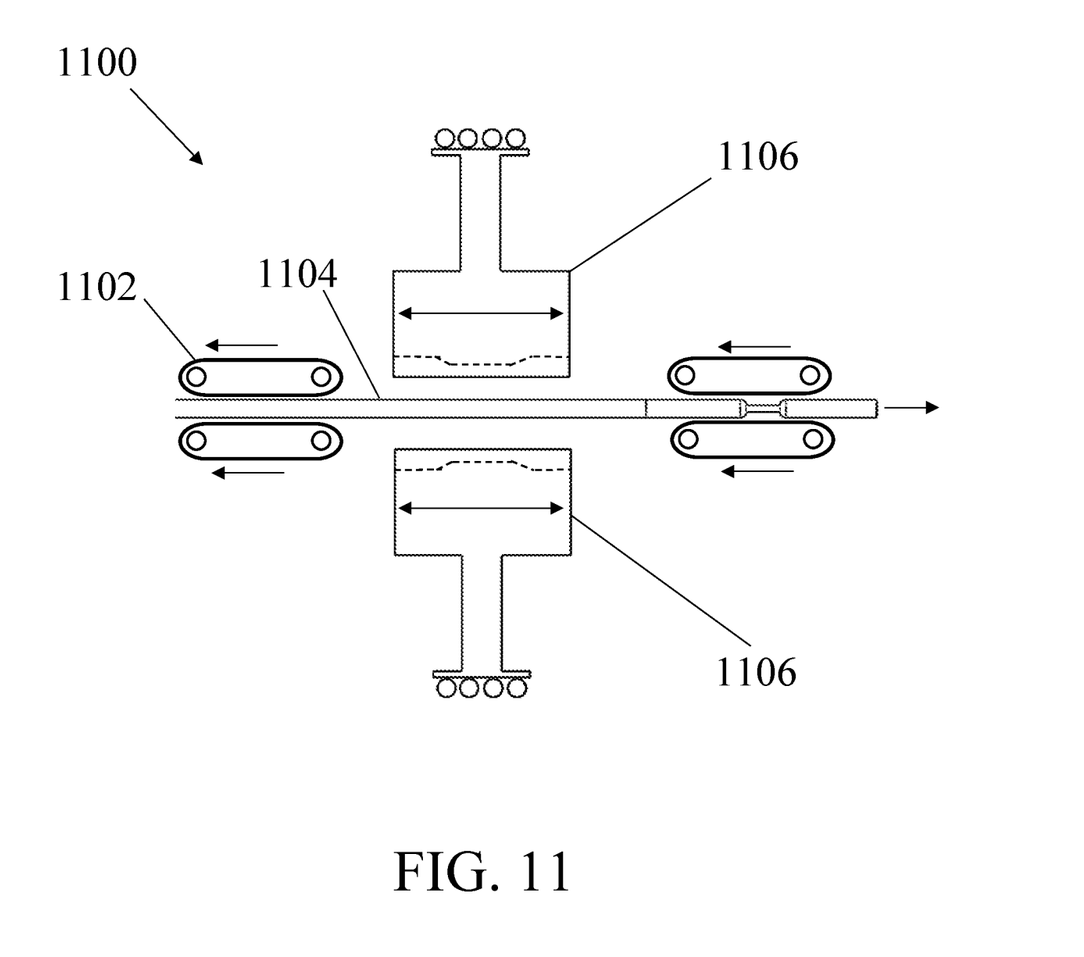
FIG. 11 is a side view of an expanding molding press and variable speed extrusion pulling rollers.

FIG. 11 is a side view of a molding press 1100 and variable speed pulling rollers 1102. Operation of the expanding molding press 1100 can include stretching an extruded tube 1104 in the longitudinal direction with the variable speed pulling rollers 1102 rotating about an axis perpendicular to the longitudinal axis of the extruded tube 1104 when the opposing sections 1106 of the molding press 1100 are clamped onto the extruded tube 1104. The variable speed pulling rollers 1102 can stretch the extruded tube 1104 to reduce the specific weight of material making up the extruded tube 1104. While opposing sections 1106 of the molding press 1100 are moved vertically to clamp around the extruded tube 1104, the opposing sections 1106 may also be translated horizontally to move at the same speed as the extrusion to avoid breaking, tearing, or bunching up of the extruded tube 1104. Lead-in features in the horizontally axial direction may also be used to avoid abrupt geometry changes. The molding press 1100 of this example may also incorporate heating and vacuum features as described in FIGS. 3, 4, and 5.

Figure 12:
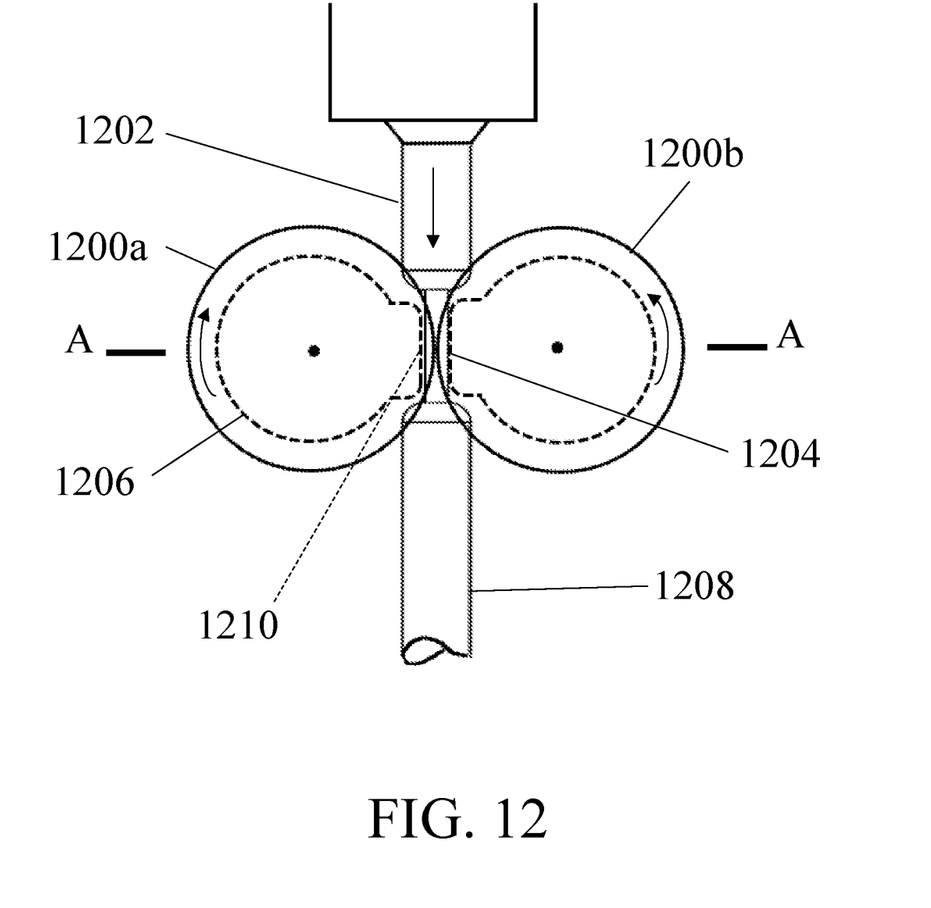
FIG. 12 is a top view of a pair of opposing drums.
Figure 13:
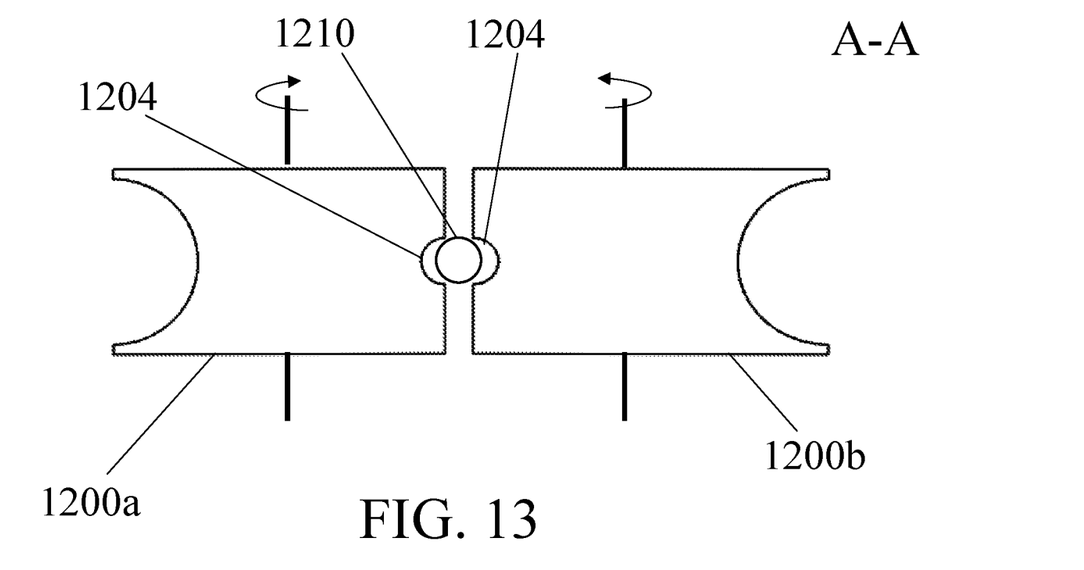
FIG. 13 is a cross-sectional view of the small diameter section of the pair of opposing drums.
Figure 14:
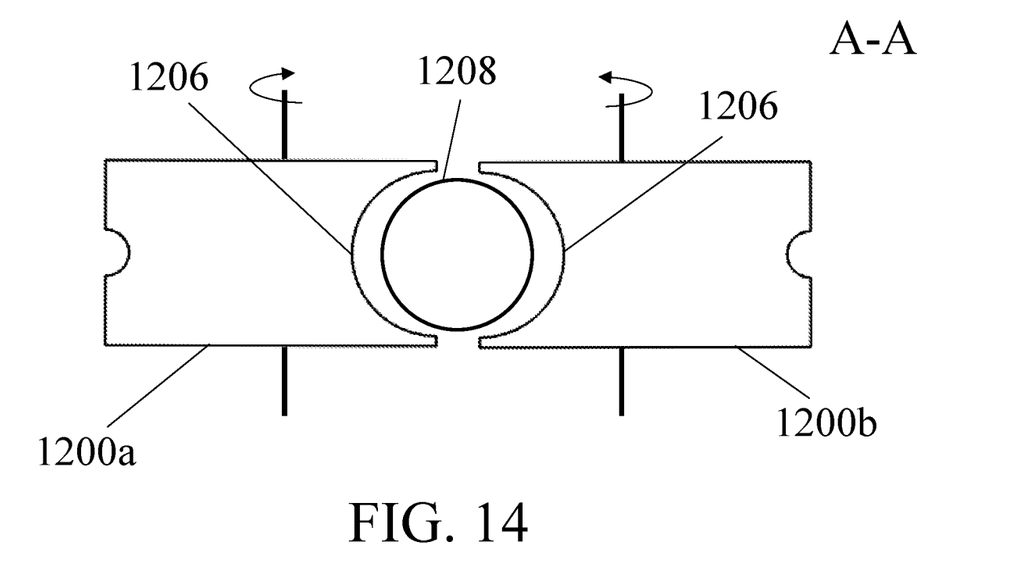
FIG. 14 is a cross-sectional view of the large diameter section of the pair of opposing drums.

FIG. 12 is a top view of a pair of opposing drums, or drums 1200a,b. The extruded tube 1202 can extend between the drums 1200a,b, where each drum 1200a, 1200b rotates about an axis perpendicular to a longitudinal axis of the extruded tube 1202. Each drum 1200a, 1200b can include an outside radial surface having a small diameter section 1204, a cross-section of which marked by location A-A is shown in FIG. 13, and a large diameter section 1206, a cross-section of which marked by location A-A is shown in FIG. 14, where the drums 1200a,b form the main body sections 1208 and the return line sections 1210 by applying the small diameter sections 1204 of the drums 1200a,b to the extruded tube 1202.

In some implementations, as the extruded tube 1202 passes through the drums 1200a,b, the drums 1200a,b are rotated to the large diameter section 1206 to allow the extruded tube 1202 to pass through the drums 1200a,b without touching either of the drums 1200a,b. When it is time to form a return line section 1210, the drums 1200a,b are rotated such that a small diameter section 1204 of the drums 1200a,b forms the main body sections 1208 and the return line sections 1210 as the extruded tube 1202 and the drums 1200a,b move together. In some implementations, the drums 1200a,b can be stationary relative to longitudinal motion of the extruded tube 1202. In other implementations, the drums 1200a,b can move along an axis parallel to a longitudinal axis of the extruded tube 1202 at a speed at which the extruded tube 1202 is extruded. This can allow the extruded tube 1202 to be created with varied lengths of main body sections 1208 having return line sections 1210 in between.

Operation of the drums 1200a,b can include moving the extruded tube 1202 in a longitudinal direction through the drums 1200a,b where an outside radial surface of each drum 1200a, 1200b has a small diameter section 1204 and a large diameter section 1206. The operation of the drums 1200a,b can also include rotating each of the opposing drums 1200a, 1200b about an axis perpendicular to a longitudinal axis of the extruded tube 1202 and forming the main body sections 1208 and the return line sections 1210 into the extruded tube 1202 by applying the small diameter sections 1204 of each opposing drum to the extruded tube 1202 according to a first pattern.

A frequency with which the small diameter sections 1204 of each opposing drum 1200a, 1200b are applied to the extruded tube 1202 can be changed to form a second a pattern. Operation of the drums 1200a,b can also include forming the main body sections 1208 and the return line sections 1210 by applying the small diameter sections 1204 of each opposing drum 1200a, 1200b to the extruded tube 1202 according to the second pattern. In some implementations, the operation of the drums 1200a,b can include changing speed of the extruded tube 1202 relative to the drums 1200a,b before and after the small diameter sections 1204 of the drums 1200a,b are applied to the extruded tube 1202 to change a wall thickness of the extruded tube 1202. In other words, the extrusion speed and relative motion of the extruded tube 1202 before and after the extruded tube 1202 passes through the drums 1200a,b can be manipulated to ensure the proper wall thickness is produced in the return line sections 1210. In some implementations, multiple drum pairs can be used to produce multiple different shapes on the same extruded tube. For example, one set of drums can form the ends of an extruded tube section without corrugations to enable the attachment of end fittings, and another set can form return line sections.

The embodiments of FIGS. 10-14 enable faster production speeds, improve material properties, allow the use of a wider variety of material grades, and allow vastly more flexibility than can be achieved using a more standard corrugation process.

While the disclosure has been described in connection with certain embodiments, it is to be understood that the disclosure is not to be limited to the disclosed embodiments but, on the contrary, is intended to cover various modifications and equivalent arrangements.

What is claimed is:

1. An apparatus for forming pressure vessel liners, comprising:
   an extruder configured to form an extruded tube at an extrusion speed by driving a parison through a die; and
   formation units, comprising:
     an interchange mechanism comprising a top-loading automated replacement apparatus, the interchange mechanism configured to exchange some active blocks having a first block pattern with inactive blocks having a second block pattern so that the formation unit is switchable between the first block pattern and the second block pattern; and
     rollers having variable rotation speeds, wherein the rollers have an outside radial surface having large diameter sections and small diameter sections and are rotatable about an axis perpendicular to a longitudinal axis of the extruded tube at the variable rotation speeds to form main body sections and connecting sections of the extruded tube, wherein the rollers are configured to:

form the extruded tube into the main body sections and the connecting sections according to a first roller pattern;

change the pattern according to which the main body sections and the connecting sections are formed to a second roller pattern without interrupting a continuous cycle of the rollers and without stopping the extrusion of the extruded tube;

change the variable rotation speeds from first speeds to second speeds that differ from the first speeds and the extrusion speed while changing the pattern from the first roller pattern to the second roller pattern so that a thickness of a wall of the extruded tube is controlled; and form the extruded tube into the main body sections and the connecting sections according to the second roller pattern.

2. The apparatus of claim 1, wherein the rollers are movable along an axis parallel to the longitudinal axis of the extruded tube at a speed at which the extruded tube is extruded.

3. The apparatus of claim 1, wherein the variable rotational speeds of the rollers are configured to control the thickness of the wall of the extruded tube between the main body sections and the connecting sections as the rollers rotate between the small diameter sections and the large diameter sections.

4. The apparatus of claim 1, wherein the rollers are configured to match a speed of the extruded tube when changing the variable rotation speeds from the first speeds to the second speeds.

5. The apparatus of claim 1, further comprising:
a heating box positioned adjacent to the extruder, overlapped with the extruded tube, and configured to provide mold surface temperatures.

6. The apparatus of claim 1, wherein the heating box further is configured to vacuum suction to supplement air pressure applied within the extruded tube.

7. The apparatus of claim 1, further comprising:
a corrugation bed adjacent to the top-loading automated replacement apparatus and configured to house the inactive blocks before exchanging with the active blocks.

8. The apparatus of claim 1, wherein the interchange mechanism further comprises alternative inactive bocks configured to form another block pattern that is different than the first and second block patterns.

9. An apparatus for forming pressure vessel liners, comprising:
an extruder that drives a parison through a die and a mandrel to form an extruded tube; and
a formation unit that forms the extruded tube into main body sections and connecting sections according to differing first and second patterns, the formation unit comprising:
active blocks that form the first pattern;
inactive blocks that form the first pattern, the second pattern, or a terminal pattern; and
an interchange mechanism comprising a top-loading automated replacement apparatus, the interchange mechanism configured to exchange some of the active blocks with some of the inactive blocks so that the formation unit is switchable between the first pattern, the second pattern, and one or more terminal ends,
wherein the active blocks and the inactive blocks have different sizes and are exchangeable to switch between the first pattern and the second pattern, and
wherein the active blocks and the inactive blocks are exchangeable without stopping the extrusion of the extruded tube and without stopping the formation unit to switch between the first pattern and the second pattern.

10. The apparatus of claim 9, further comprising:
at least two pairs of motor spindles configured to rotate; and
a pair of tracks, each track forming a closed loop and connected with one of the at least two pairs of motor spindles,
wherein the pair of tracks is configured to receive the active blocks and the inactive blocks that the top-loading automated replacement apparatus moves to switch between the first pattern, the second pattern, and the one or more terminal ends and to rotate the active blocks, the inactive blocks, or both in and out of contact with the extruded tube.

11. The apparatus of claim 10, wherein each track in the pair of tracks is configured to hold an odd number or an even number of blocks depending on whether the first pattern or the second pattern is used to form the extruded tube.

12. The apparatus of claim 11, wherein pair of tracks are configured to exchange the active and inactive blocks by top-loading one of the inactive blocks that is adjacent to one of the active block into one or both tracks of the pair of tracks.

13. The apparatus of claim 12, wherein the active and inactive blocks are in contact with each other and configured to form a different pattern by exchanging one of the inactive blocks with one of the active blocks while remaining in contact.

14. The apparatus of claim 9, further comprising:
a heating box positioned adjacent to the extruder, overlapped with the extruded tube, and configured to provide mold surface temperatures.

15. The apparatus of claim 9, wherein the heating box further is configured to vacuum suction to supplement air pressure applied within the extruded tube.

16. The apparatus of claim 9, further comprising:
a corrugation bed adjacent to the top-loading automated replacement apparatus and configured to house the inactive blocks before exchanging with the active blocks.

17. The apparatus of claim 9, wherein the interchange mechanism further comprises alternative inactive bocks configured to form another block pattern that is different than the first and second block patterns.

* * * * *